US010407221B2

(12) United States Patent
Carrillo Rosillo (10) Patent No.: US 10,407,221 B2
(45) Date of Patent: Sep. 10, 2019

(54) RATTLE SPHERICAL DISPENSING CAP

(71) Applicant: GRISI HNOS, S.A DE C.V., Mexico City (MX)

(72) Inventor: Jose de Jesús Carrillo Rosillo, Mexico City (MX)

(73) Assignee: GRISI HNOS, S.A DE C.V., Mexico City (MX)

( * ) Notice: Subject to any disclaimer, the term of this patent is extended or adjusted under 35 U.S.C. 154(b) by 0 days.

(21) Appl. No.: 15/668,530

(22) Filed: Aug. 3, 2017

(65) Prior Publication Data

US 2018/0290792 A1 Oct. 11, 2018

(30) Foreign Application Priority Data

Aug. 3, 2016 (MX) .......................... U/2016/000320

(51) Int. Cl.
| | |
|---|---|
| *B65D 41/56* | (2006.01) |
| *B65D 41/26* | (2006.01) |
| *D06F 39/02* | (2006.01) |
| *G01F 19/00* | (2006.01) |

(52) U.S. Cl.
CPC .............. *B65D 41/56* (2013.01); *B65D 41/26* (2013.01); *D06F 39/02* (2013.01); *G01F 19/00* (2013.01)

(58) Field of Classification Search
CPC ........ B65D 41/46; B65D 47/20; B65D 47/30; B65D 2215/02; B65D 41/56; B65D 2251/105; B65D 39/00; B65D 39/0047; B65D 41/18; A45D 40/00
USPC ........................................................ 215/228
See application file for complete search history.

(56) References Cited

U.S. PATENT DOCUMENTS

| | | | | |
|---|---|---|---|---|
| 2,218,308 | A | | 10/1940 | Comer |
| 2,458,380 | A | * | 1/1949 | Horvath ................. D06F 39/14 |
| | | | | 220/246 |
| 2,543,432 | A | * | 2/1951 | Boxer ................ B65D 47/0876 |
| | | | | 220/840 |
| 2,726,796 | A | | 12/1955 | Aldridge |
| 2,779,519 | A | | 1/1957 | Rossetti |
| 3,443,712 | A | * | 5/1969 | Hauser ................... B65D 39/00 |
| | | | | 215/209 |
| 4,181,246 | A | | 1/1980 | Norris |
| 4,390,002 | A | * | 6/1983 | Daily, III ............ A47J 37/0786 |
| | | | | 126/25 R |
| 5,876,140 | A | * | 3/1999 | Kuramoto ............ A45D 34/042 |
| | | | | 215/295 |

(Continued)

FOREIGN PATENT DOCUMENTS

| | | |
|---|---|---|
| EP | 357981 A1 | 3/1990 |
| EP | 925230 B1 | 2/2001 |

*Primary Examiner* — Shawn M Braden
(74) *Attorney, Agent, or Firm* — James P. Muraff; Neal, Gerber & Eisenberg LLP (57) ABSTRACT

A spheroidal dosing cap using a push-pull mechanism which includes a flow valve coupled to a spheroidal main body comprising a lower hemispherical element and an upper hemispherical element joined together through coupling or joining means, wherein the upper hemispherical element comprises a valve opening/closing orifice in its dome and a plug of the flow valve is inserted in the valve opening/closing orifice to close the flow of the substance running through the valve flow; a coupling section comprising a helical flange on its inner wall through which the flow valve couples to the threaded nozzle of the container.

27 Claims, 8 Drawing Sheets

(56) References Cited

U.S. PATENT DOCUMENTS

| | | | |
|---|---|---|---|
| 2001/0040162 A1* | 11/2001 | Stiegler | B60K 15/0406 |
| | | | 220/86.2 |
| 2007/0039970 A1* | 2/2007 | Ivey | B43M 99/009 |
| | | | 220/603 |
| 2008/0169261 A1* | 7/2008 | Druitt | B65D 47/0809 |
| | | | 215/237 |

* cited by examiner

RATTLE SPHERICAL DISPENSING CAP

FIELD OF THE INVENTION

The present invention refers to a spheroidal dosing cap that is screwed onto containers (bottles, containers) of care and hygiene products for children and babies. The contents of the container can be poured in measured quantities through the opening in the present dosing cap which is actuated by a push-pull mechanism. Additionally, the cap of the present invention comprises internal structural features which further provide it with a baby's rattle purpose.

BACKGROUND OF THE INVENTION

Currently there are different types of dispenser caps that are coupled to containers of hygiene products, such as hair care products, beauty products, lotions, skin creams, health care products, etc., which are well known and have gained wide acceptance on market. Such dispenser caps should function in a satisfactory manner over the lifespan of the dispensed product and it must also be highly functional in avoiding leakage during transportation of the product. Mainly, a dispenser cap should be comfortably manipulated between an open-closed state, without excess product accumulating on the exposed surfaces, and above all it is important that it is aesthetically pleasing to the consumer. When it comes to products for children or babies in particular, dosing caps should be attractive and safe for children or babies.

U.S. Pat. No. 2,218,308 patent discloses a bottle cap, particularly the one for protecting an open container and preserving the contents until use, and its main purpose is to provide a single unit cap. The cap has an orifice that opens and closes automatically in response to external pressure applied to the cap, said cap having self-sealing apertures; as well as a pair of elements that serve as grips for the fingers, which facilitate opening of the cap. The cap is sealed and couples to the neck of a bottle, the cap is preferably composed of resilient material such as rubber and is molded to spheroidal shape to provide a dome-shaped surface and an integral annular flange surrounding an opening.

U.S. Pat. No. 2,726,796 patent discloses a cap for a collapsible tube such as a toothpaste or shaving cream tube. In particular, the cap comprises a shank provided with internal threads at its lower end, adapted to be screwed onto a conventional collapsible tube, an upper casing relative to a lower casing, wherein the lower casing is attached to the stem by means of a plurality of braces which rigidly support the lower casing at each of the upper ends of said braces, while the braces are supported at their lower end by the shank. The lower casing is pivotably attached to the upper casing through a hinge, wherein the hemispherical upper casing comprises a recess in the center of its surface, which is arranged to engage the upper edge of the shank.

U.S. Pat. No. 2,779,519 discloses a closing device comprising a cap mounted on a carrier, a spherical ball; wherein said carrier and cap form a spherical housing extending partly in the holder and partly in the cap, for housing said ball, the ball has a duct extending diametrically therethrough, the cap has an opening adapted to be connected by the duct in the ball, a trunnion that extends axially of the ball in a direction perpendicular to the duct and said trunnion engages a recess in the cap, which is adapted to move in a diametrical plane of the housing perpendicular to the axis of the opening in the carrier and the opening of the cap. The ball has a slot extending therein along an equatorial circle lying in a plane containing said trunnion and the recess in the cap, the plane of said circle forming an angle of 45° with the duct, wherein the slot extends through an arc of one fourth of the circumference of the ball.

U.S. Pat. No. 4,181,246 patent discloses a cap for a collapsible tube, wherein the cap includes a hemispherical base member, which in one embodiment comprises a substantially cylindrical neck portion which is attached at its end to the portion of the reinforcement member proximal to the opening of the collapsible tube. The cylindrical neck portion defines an elongated bore, which opens at its end on end surface of the neck portion and which is arranged in fluid communication with the opening in the reinforcement member for purposes of receiving the contents of the tube as the tube wall is collapsed by compression forces. The opposite end of the bore opens into the top surface of the neck portion. The base member includes a substantially spherical portion that mounts to the neck portion and defines a substantially spherical surface, wherein the spherical portion defines a bore which includes a first end that communicates with end of the bore of the neck portion and an opposite end which opens on the surface of the spherical portion at a predetermined location and serves as an outlet through which the contents of the tube are discharged.

EP 357,981 A1 patent application relates to a dispenser closure and cap, either for liquid or powdered materials, comprising a closure portion to be connected to a container lip, and a plug, wherein the closure portion has the shape on the free end thereof, as a spherical segment provided with one or more dispensing orifices and the plug is constructed as an oscillating sector plug which matches the outer surface of the spherical segment and can be displaced angularly on the surface of the a spherical segment about a central axis of said segment from a position in which it closes all the dispensing orifices to a plurality of open positions in each of which only one or more dispensing orifices are open and all the remaining dispensing orifices (2', 2) are closed.

EP 925,230 B1 refers to a plug comprising a cylindrical portion for engaging the neck of a container; having a slot that extends peripherally on at least one portion of the circumference of the cylindrical portion. Two channels, separated from one another, extend in the cylindrical part of the plug and open in the slot through orifices separated from each other in the peripheral direction of the slot. A diaphragm made of elastomeric material, which closely matches the shape of the cylindrical portion and of the surface slot covers the orifices of the two channels, wherein the diaphragm forms a shut-off valve which by its elastic deformation allows a substance contained in the container to flow from the inside to the outside of the container.

Nevertheless, none of the cap dispensers known in the state of the art comprise each and every one of the technical features of the dosing cap of the present invention, which has more advantages over what is known in the prior art. The structural design and the materials used to make the dosing cap of the present invention make it simple to manufacture and assemble because the cap structure is manufactured in two hemispherical pieces molded in polypropylene or another similar material. Such plastic can be produced in a wide variety of flashy colors, aesthetically pleasing to the consumer, and can be recycled. Other operational advantages attributable to the structural technical characteristics will be readily apparent to the skilled person from the accompanying drawings and the subsequent specification.

The present invention provides a spheroidal dosing cap for containers of hygiene and health products, which has the additional baby's rattle purpose; which is appealing to children or babies.

OBJECTS OF THE INVENTION

According to the present invention, its main object is to provide a spheroidal cap for containers of liquid care and hygiene products.

A second object of the present invention is to provide a spheroidal cap which comprises a push-pull mechanism through which it allows dosing of the care and hygiene product without the necessity of removing the entire container cap.

A third object of the present invention is to provide a spheroidal dosing cap, lightweight, having the additional baby's rattle purpose; which is attractive to children and babies.

A fourth object of the present invention is to provide a spheroidal dosing cap which structurally comprises the minimum number of components which are economical to manufacture.

The fifth object of the present invention is to provide a spheroidal dosing cap easy to assemble.

A sixth object of the present invention is to provide a spheroidal dosing cap difficult to disassemble, for the safety of children.

SUMMARY OF THE INVENTION

In general, according to the present invention, provided is a spheroidal dosing cap, safe for children, whose assembly mechanism comprises childproof elements which prevent any child from being able to structurally disassemble said cap, and an opening and closing push-pull type mechanism that prevents a child from manually opening the cap.

The dosing cap of the present invention couples to the neck of the container by means of a threaded coupling of the inlet duct of the cap to the neck of the container, wherein once the spheroidal dosing cap is placed and screwed on, it no longer rotates about its own axis, staying fixed to the neck of the container, which facilitates manual aperture by unscrewing.

The spheroidal rattle dosing cap comprises a main body consisting of a spherical housing which is composed of a lower hemispherical element comprising a coupling orifice in its dome projecting into the interior thereof through an inner wall, forming a first valve coupling plunger having at its lower end an annular valve retaining annular ring which forms part of the inner wall of the lower hemispherical element; an upper hemispherical element comprising in the dome an opening/closing orifice of a diameter smaller than the coupling orifice of the lower hemispherical element, wherein the upper hemispherical element comprises therein a second valve coupling plunger of smaller dimensions than the first valve coupling plunger. The second valve coupling plunger surrounds the opening/closing orifice and an annular surface which forms part of the inner wall of the upper hemispherical element comprises an annular rim which covers the periphery of the diameter of the opening/closing orifice extending to the interior of the upper hemispherical element; a flow valve is composed of a one-piece hollow body of non-uniform cylindrical shape comprising a conduit flow, said valve having at its lower end a coupling section comprising on its outer wall a plurality of longitudinal projections which form a grooved outer wall, and on its inner wall comprises a helical flange, wherein the inner diameter of the coupling section of the flow valve is proportional to the diameter of the neck of the container where the dosing cap of the present invention couples, allowing threaded coupling between the helical flange of the coupling section of the flow valve and the threaded neck of the container containing the product, said coupling section further comprising an inner upper wall with a central internal conical ring surrounding the conduit flow and acting as a sealing and tightness element with the inner diameter of the neck of the container.

Further, the flow valve comprises at its upper end a dosing section consisting of a cylindrical body smaller in diameter than the coupling section, which comprises at least one annular sealing flange near the upper end of the dosing section. Specifically, the surface or tip of the flow valve comprises a cylindrical plug which forms a small socket centered on the surface of the flow valve, surrounded by at least two dosing openings which provide the outlet of the fluid flowing through the inner duct of the flow valve from the container, wherein the diameter of the socket is equal to the diameter of the opening/closing orifice of the upper hemispherical element, allowing insertion of the plug into the opening/closing orifice.

The coupling section of the flow valve fits within the first valve coupling plunger of the lower hemispherical element, and the dosing section of the flow valve fits within the second valve coupling plunger of the upper hemispherical element, wherein the lower and upper hemispherical elements are assembled together through coupling means, thereby integrating the spherical housing of the dosing cap of the present invention, therefore, the flow valve is arranged within the spherical housing.

In the preferred embodiment of the present invention, acoustic elements are included in the hollow portion existing between the outer wall of the first valve coupling plunger and the inner wall of the lower hemispherical element, wherein said components consist of small parts made of plastic material, but not limited thereto, wherein a toothed ring covers the hollow portion existing between said outer wall of the first valve coupling plunger and the inner wall of the lower hemispherical element, preventing the acoustic elements from being dispersed throughout the interior of the spherical housing of the dosing cap of the present invention, so that when the dosing cap is shaken, the acoustic elements collide with each other, some striking the outer wall of the first valve coupling plunger and others the inner wall of the lower hemispherical element, thus generating a sound effect corresponding to the sound of a baby's rattle.

BRIEF DESCRIPTION OF THE DRAWINGS

For a detailed description of the present invention, reference will be made to the attached drawings wherein.

DETAILED DESCRIPTION OF THE PREFERRED EMBODIMENTS

As used herein, the spheroidal dosing cap allows the opening or closing of the flow of any substance in liquid or viscous state therethrough.

Certain terms are used throughout the following specification and claims to refer to particular features or components. As one skilled in the art will understand, different people may refer to the same feature or component using different names. This document is intended to distinguish between components or features that differ in name, but not in function. The figures in the drawings are not necessarily to scale. Some of the features and components in the present document may be shown exaggerated in scale or in some schematic form, and some details of the conventional elements may not be shown for the sake of clarity and brevity.

In the ensuing discussion and claims, the terms "including" and "comprising" are used interchangeably and are therefore to be construed as "including, but not limited to . . . ". In addition, the term "coupled" is intended to mean a direct or indirect connection. Therefore, if a first element is coupled to a second element, that connection can be made through a direct connection of the two devices, or through an indirect connection through other elements, devices, components and intermediate connections.

Figure 1A:
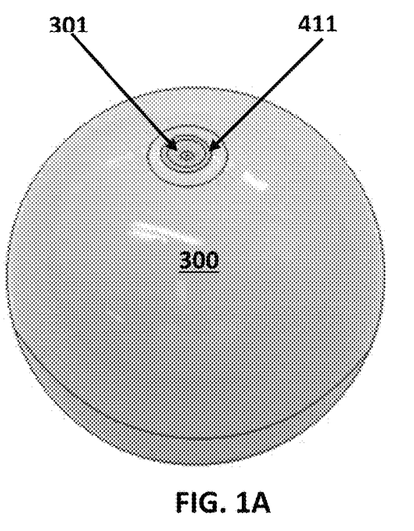
FIG. 1A shows an elevated perspective view of the spheroidal dosing cap of the present invention.
Figure 1B:
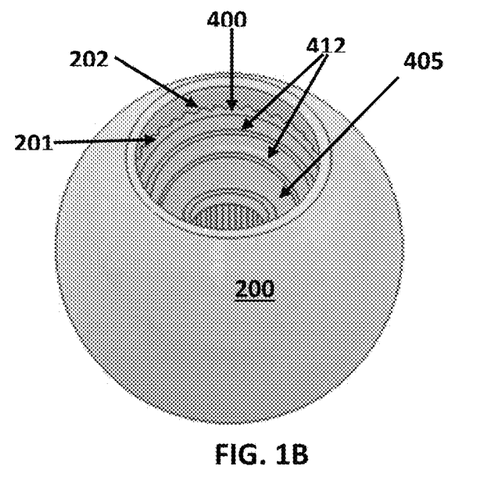
FIG. 1B shows an elevated lateral perspective view of the lower part of the dosing cap of the present invention.
Figure 1C:
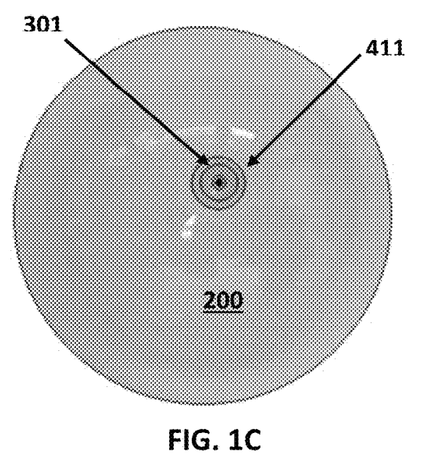
FIG. 1C shows an elevated perspective view of the upper part of the dosing cap of the present invention.
Figure 1D:
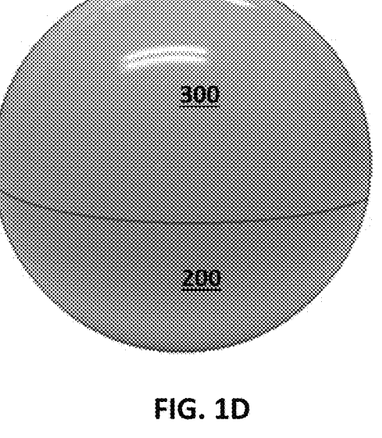
FIG. 1D shows a lateral perspective view of the upper part of the dosing cap of the present invention.

FIGS. 1A, 1B and 1C show different perspective views of the spheroidal dosing cap of the present invention in closed state, including a flow valve (not shown) coupled within a spheroidal main body comprising a lower hemispherical element (200) and an upper hemispherical element (300) coupled to one another through coupling or joining means, wherein the upper hemispherical element (300) comprises a valve opening/closing orifice (301) in its dome and a plug (411) of the flow valve is inserted into the valve opening/closing orifice (301) to close the flow of the substance passing through the flow valve (not shown).

Referring FIG. 1B, the lower portion of the dosing cap of the present invention, wherein the lower hemispherical element (200) comprises in its dome a coupling orifice (201) projecting into the interior of the lower hemispherical element (200) through an inner wall forming a first valve coupling plunger (202) where the flow valve (400) is inserted. The flow valve (400) comprises at its lower end a helical flange (412) allowing threaded coupling of the helical flange of the flow valve (400) with the threaded lip of the container and a tapered edge (405) is inserted in the container lip, where the dosing cap of the present invention is screwed.

Figure 2:
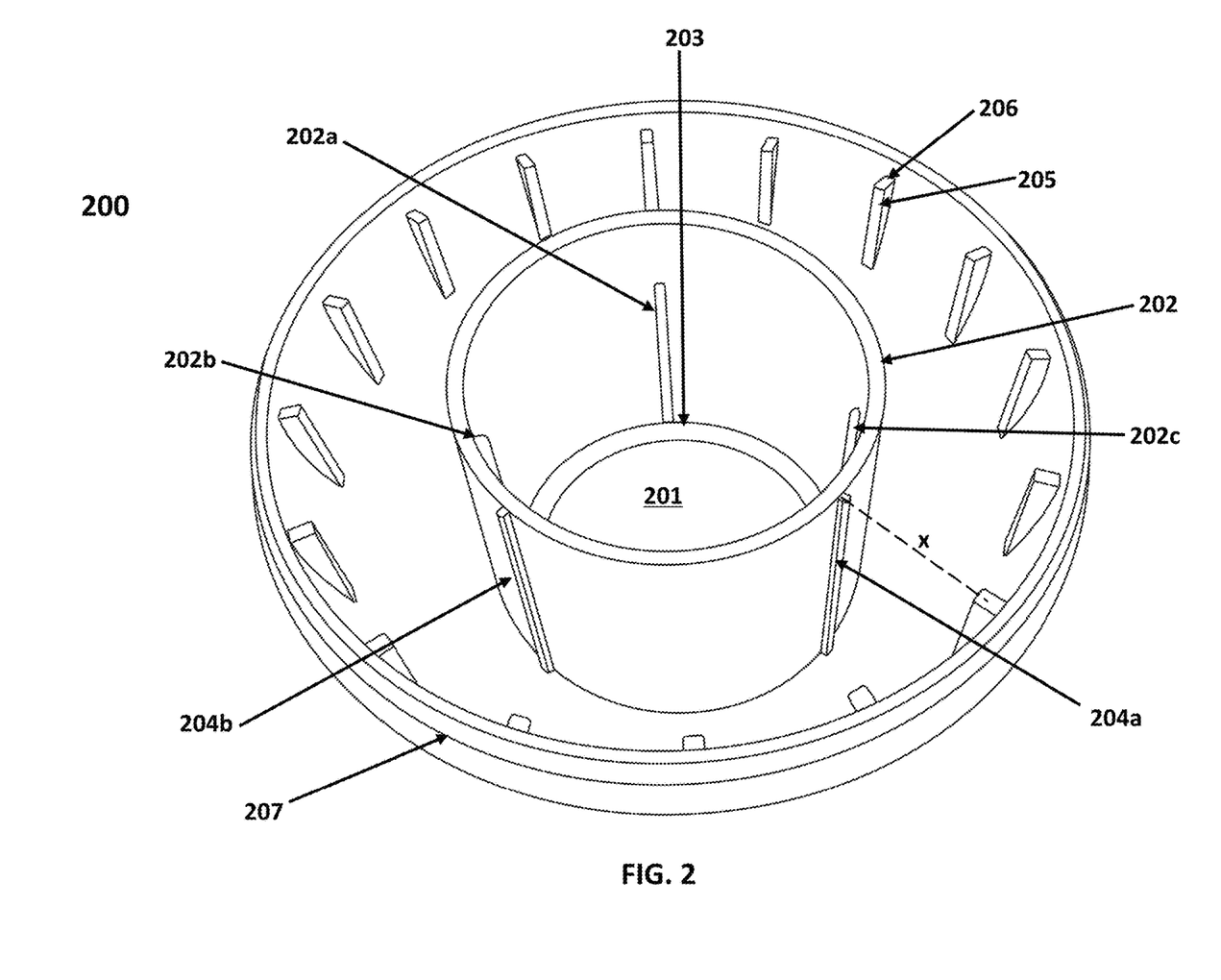
FIG. 2 shows an elevated lateral perspective view of the lower part of the lower hemispherical element of the dosing cap of the present invention.

Referring FIG. 2, the hollow lower hemispherical element (200) manufactured in one piece comprising in its dome a coupling orifice (201) projecting into the interior thereof through a cylindrical wall defining the first valve coupling plunger (202) having at its lower end an annular valve retaining ring (203) which is part of the inner wall of the lower hemispherical element (200). The height of the lower hemispherical element (200) is equal to the height of the first valve coupling plunger (202).

At least one retaining protrusion (202a), (202b), (202c) and (202d "not shown") is arranged longitudinally on the inner wall of the first valve coupling plunger (202) and equidistantly on its inner circumference, starting from the annular retaining ring (203) towards the upper end of the first valve coupling plunger (202).

Additionally, the first valve coupling plunger (202) comprises on its outer wall at least four retaining brackets (204a), (204b) (204c "not shown") and (204d "not shown") with a flat surface, arranged longitudinally on the inner outer wall of the first valve coupling plunger (202) and equidistantly on its outer circumference, projecting from the lower end towards the upper end of the first valve coupling plunger (202).

As shown in FIG. 2, the inner wall of the lower hemispherical element (200) comprises at its periphery a plurality of projections defining retaining columns (205) with a flat surface (206) which project on the curvature and equidistantly on the inner circumference near the edge of the lower hemispherical element (200), wherein the flat surfaces (206) of the retaining columns (205) match linearly on the X plane with the flat surfaces of each of the four retaining brackets (204a), (204b), (204c) and (204d).

An external stepped perimeter slot (207) arranged on the outer wall on the periphery of the edge of the lower hemispherical element (200) as a coupling means between the lower hemispherical element (200) and the upper hemispherical member (300 "not shown").

Figure 3:
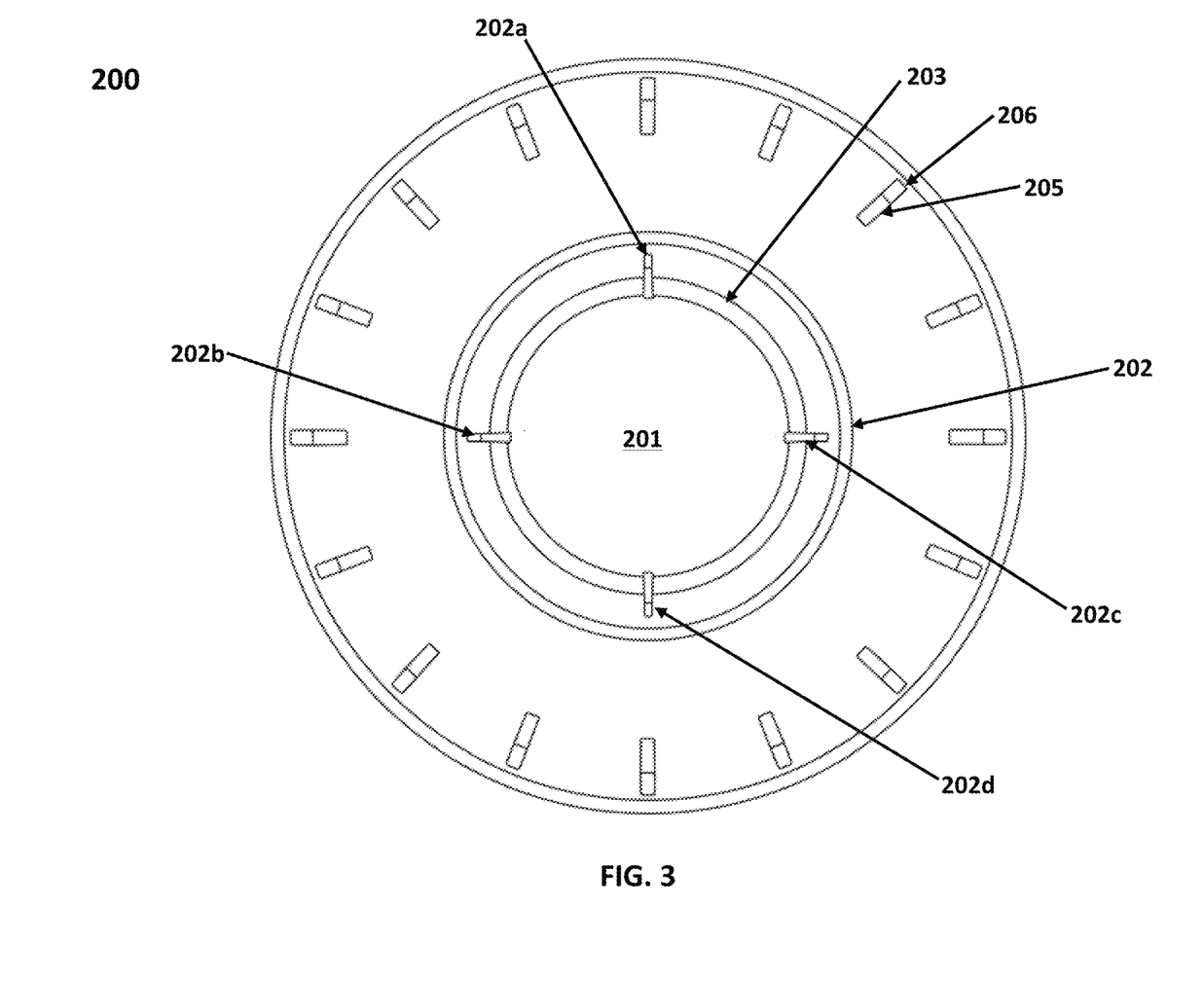
FIG. 3 shows an elevated perspective view of the lower hemispherical element of the dosing cap of the present invention.

Referring FIG. 3, the lower hemispherical element (200) comprising four retaining protuberances (202a), (202b), (202c) and (202d) arranged equidistantly on the internal circumference of the first valve coupling plunger (202). The retaining protuberances (202a), (202b), (202c) and (202d) are located from the annular retaining ring (203) to almost the upper end of the first valve coupling plunger (202) of the lower hemispherical element (200).

As shown in FIG. 3, a plurality of projections defining retention columns (205) projects parallel to the first valve coupling plunger (202) from the curvature of the inner wall to the edge of the lower hemispherical element (200), wherein each retaining column (205) comprises a flat surface (206) and is located equidistantly one from the other on the inner circumference of the lower hemispherical element (200).

According to FIG. 3, the four retaining brackets (204a), (204b) (204c) and (204d) are located equidistantly on the surface of the outer wall of the first valve coupling plunger (202). Each bracket projects from the lower end to the upper end of the first valve coupling plunger (202).

Figure 4:
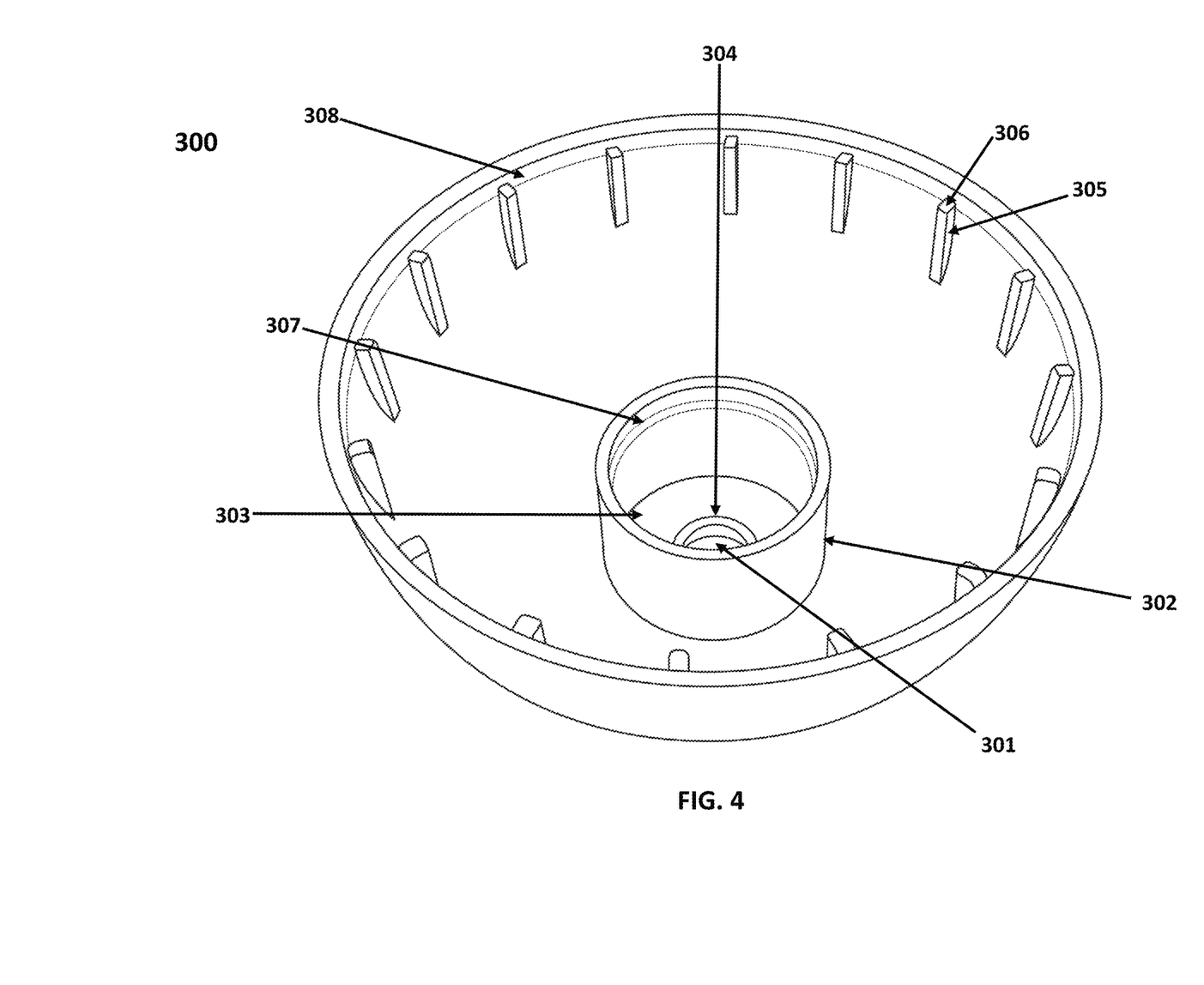
FIG. 4 shows an elevated lateral perspective view of the lower part of the upper hemispherical element of the dosing cap of the present invention.

Referring to FIG. 4, the hollow upper hemispherical element (300) manufactured in one piece, which comprises a valve opening/closing orifice (301) in its dome. A second valve coupling plunger (302) is arranged within the upper hemispherical element (300) centered in the dome, which surrounds the valve opening/closing orifice (301) and an annular surface (303) that defines part of the inner wall of the upper hemispherical element (300). Also, the annular surface (303) comprises an annular sealing edge (304) covering the periphery of the valve opening/closing orifice (301), wherein the annular sealing edge (304) projects to the interior of the upper hemispherical element (300).

As shown in FIG. 4, the inner wall of the upper hemispherical element (300) comprises, at its periphery close to its edge, a plurality of projections forming retaining columns (305) with a flat surface (306) that are located equidistantly from each other on the circumference of the upper hemispherical element (300). Further, the inner wall of the second valve coupling plunger (302) includes, near its upper end, an annular sealing flange (307).

An internal stepped perimeter slot (308) is arranged on the inner wall on the periphery of the edge of the upper hemispherical element (300) as a coupling means between the edges of the upper hemispherical element (300) and the lower hemispherical member (200 "not shown").

Figure 5:
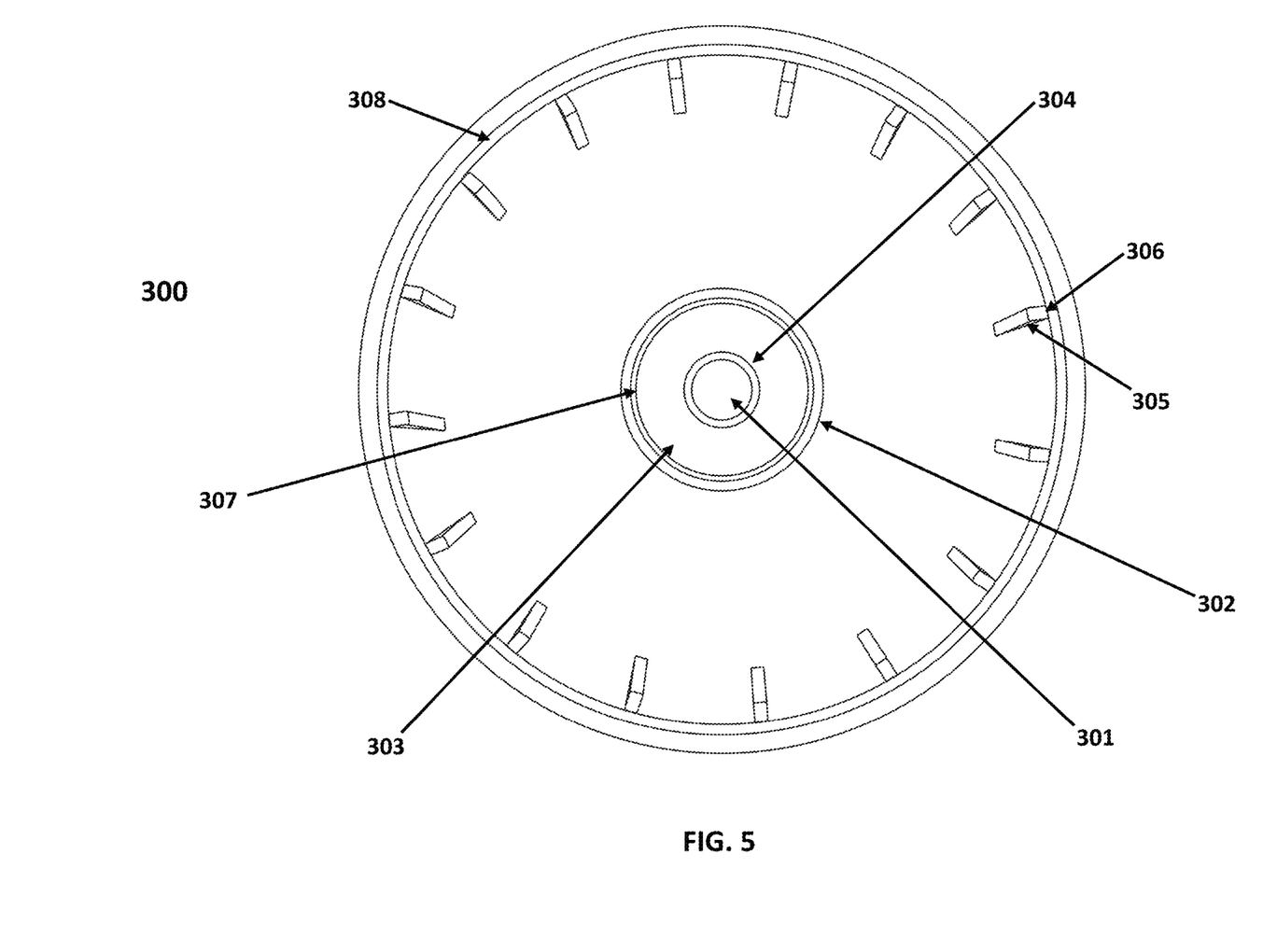
FIG. 5 shows an elevated perspective view of the upper hemispherical element of the dosing cap of the present invention.

Referring to FIG. 5, the upper hemispherical element (300) comprising the plurality of projections forming the retention columns (305) which project parallel to the second valve coupling plunger (302) from the curvature of the inner wall to the edge of the lower hemispherical element (300), wherein each retaining column (305) comprises a flat surface (306) and is located equidistantly from the other on the inner circumference of the lower hemispherical element (300).

As shown in FIG. 5, the second valve coupling plunger (302) is located within the upper hemispherical element (300), centered in its dome, wherein the second valve coupling plunger (302) surrounds the valve opening/closing orifice (301) and the annular surface (303) that forms part of the inner wall of the upper hemispherical element (300). The annular sealing edge (304) covers the circumference of the valve opening/closing orifice (301), wherein said edge (304) projects into the interior of the upper hemispherical element (300).

Figure 6:
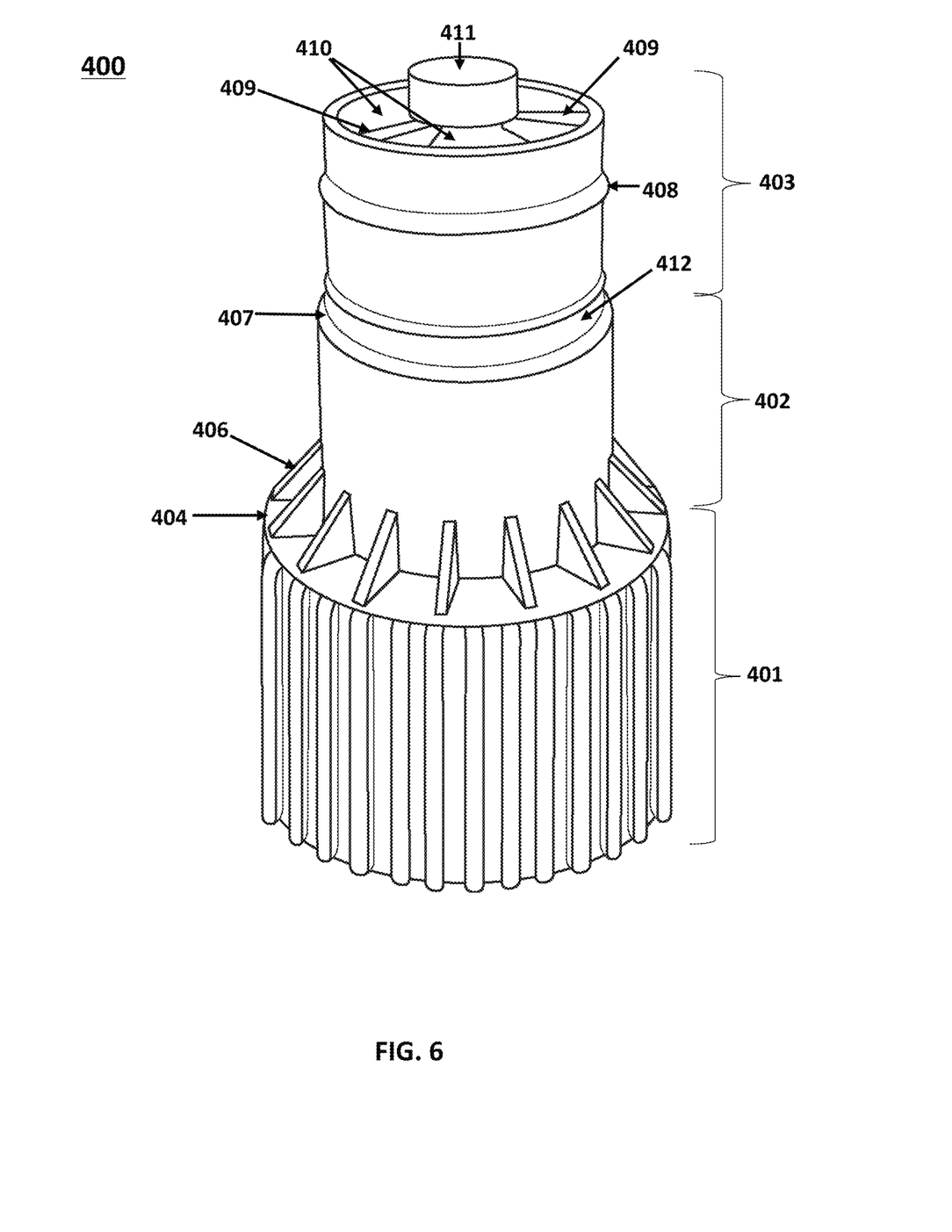
FIG. 6 shows a lateral perspective view of the flow valve of the dosing cap of the present invention.

Referring to FIG. 6 shows a detailed front view of the flow valve (400) formed of a one-piece hollow body of non-uniform cylindrical shape which comprises a conduit flow therein (not shown). The lower end of the flow valve (400) comprises a coupling section (401) formed by a lower cylindrical body having a plurality of longitudinal projections on its outer wall and a helical flange on its inner wall that allows the threaded coupling between the helical flange of the flow valve (400) and the threaded lip of the container in which the dosing cap of the present invention is mounted. Therefore, the inner diameter of the coupling section (401) is proportional to the diameter of the lip or neck of the container where the spherical dosing valve is fitted, in such a way that allows the threaded connection between the helical flange (412, FIG. 1B) of the coupling section (401) of the flow valve (400) and the threaded neck of the container.

As shown in FIG. 6, the intermediate part of the flow valve (400) has a flow section (402) which defines a cylindrical body with a diameter smaller than the diameter of the coupling section (401) and larger in diameter than the inner diameter of the second valve coupling plunger (302, not shown) of the upper hemispherical element (300, not shown); wherein the flow section (402) is attached to the coupling section (401) by a diameter reducing ring (404) arranged at the upper end of the coupling section (401) and at the lower end of the flow section (402). The lower end of the flow section (402) projects into the coupling section (401) forming a tapered edge ((405), FIG. 1B) which couples to the interior of the container lip when the coupling section (401) of the flow valve (400) couples to the threaded neck of the container.

A plurality of supporting elements (406) reinforce the assembly between the coupling section (401) and the flow section (402). The plurality of supporting elements (406) are arranged equidistantly over the entire circumference of the diameter reducing ring (404), wherein the supporting elements (406) have a triangular shape but are not limited to said shape.

The upper end of the flow valve (400) comprises a diffuser section (403), which defines a cylindrical body with diameter that is smaller than the diameter of the body of the flow section (402); wherein the diffuser section (403) is attached to the flow section (402) by an angled reducing ring (407) arranged at the upper end of the flow section (403) and at the lower end of the diffuser section (403).

As shown in FIG. 6, the diffuser section (403) includes, near its upper end, an annular sealing flange (408) which snaps into the interior of the second valve coupling plunger (302) of the upper hemispherical element (300) (not shown). A cylindrical plug (411), supported by at least two supporting elements (409), arranged in the center of the hollow surface of the diffuser section (403) and surrounded by at least two diffuser openings (410) through which it outlets the fluid flows through the inner duct of the flow valve (400). The diameter dimension of the plug (411) is equal to the diameter of the valve opening/closing orifice (301) (301, not shown) of the upper hemispherical element (300, not shown) allowing the snap-in insertion of the plug (411) in the valve opening/closing orifice (301).

The lower part of the diffuser section (403) has a coupling and sealing section (412). The diameter of the coupling and sealing section (412) is equal to the inner diameter of the second valve coupling plunger (302) of the upper hemispherical element (300) and largest than the diameter of the end upper part of the diffuser section (403).

Figure 7:
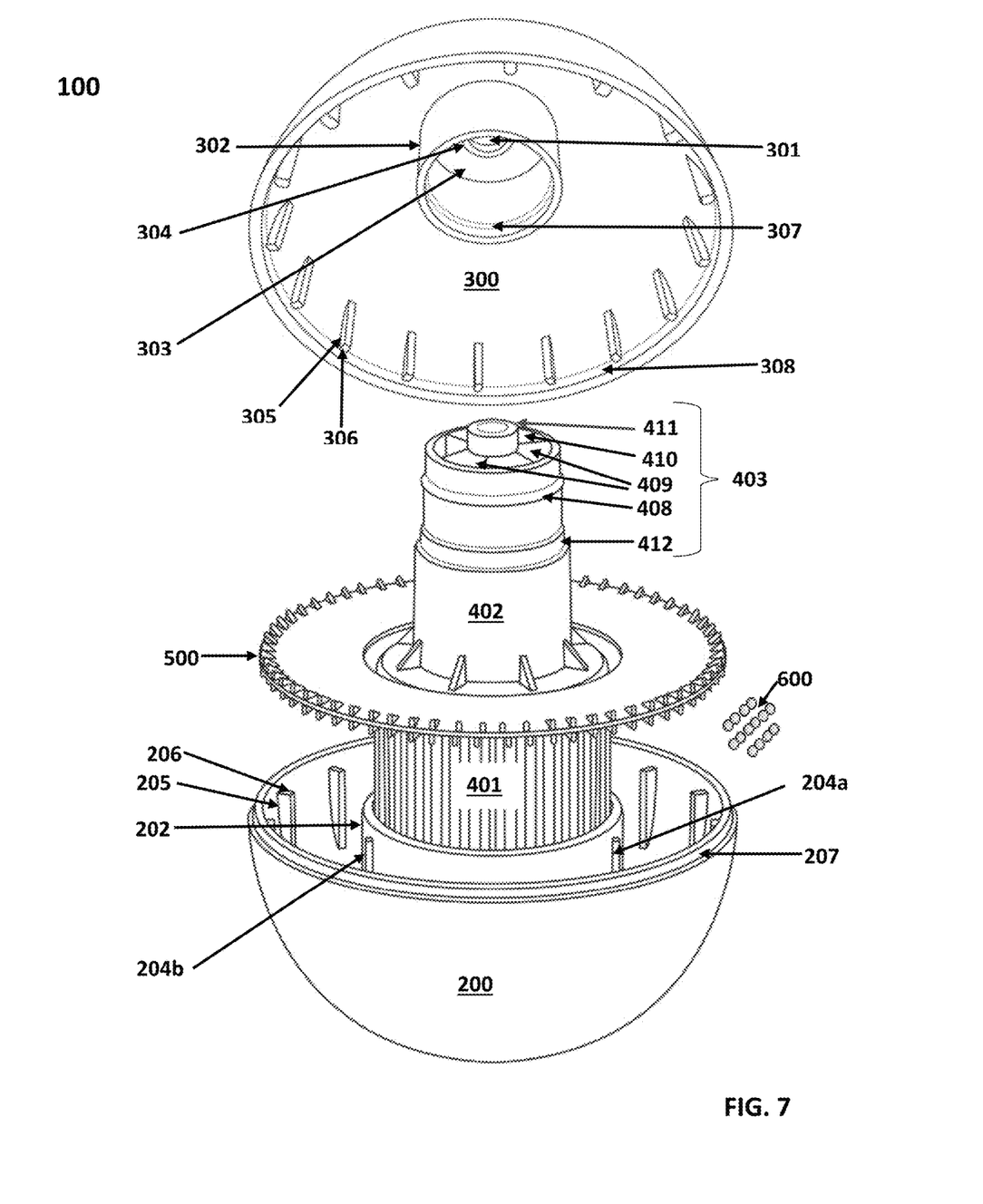
FIG. 7 and FIG. 8 show two exploded views of the dosing cap of the present invention.
Figure 8:
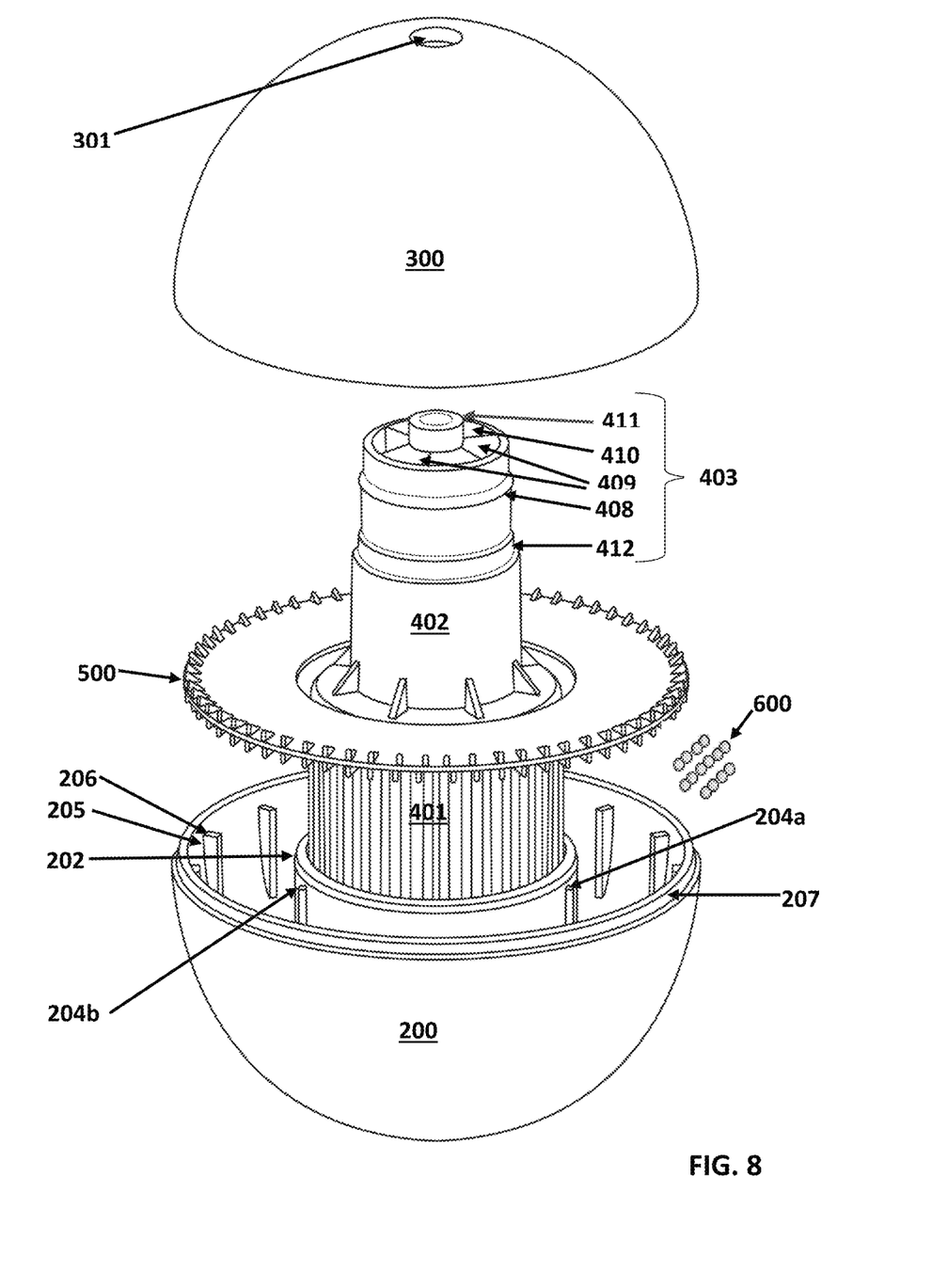

FIGS. 7 and 8 show a detailed exploded view of the dosing valve of the present invention. The coupling section (401) of the flow valve (400) has a grooved outer wall, which engages the interior of the first valve coupling plunger (202) of the lower hemispherical member (200); wherein the retaining edges (202a, 202b, 202c and 202d "not shown") which are arranged longitudinally on the inner wall of the first valve coupling plunger (202), engage the grooves of the grooved outer wall of the first valve coupling plunger (202), which prevents the flow valve (400) from rotating inside the first valve coupling plunger (202) of the lower hemispherical member (200). The above allows the flow valve (400) to slide longitudinally upwards or downwards within the first valve coupling plunger (202), having the annular retaining ring (203) as a lower limit which prevents the flow valve (400) from moving out of the coupling orifice (201 not shown) and lower hemispherical element (200).

A plurality of acoustic elements (600) are arranged within the hollow space of the lower hemispherical element (200), specifically the space between the outer wall of the first valve coupling plunger (202) and the inner wall of the lower hemispherical element (200). Therefore, when the spherical dosing cap of the present invention is shaken, the acoustic elements collide with each other and strike the outer wall of the first valve coupling plunger (202) and the inner wall of the lower hemispherical element (200) generating an acoustic effect corresponding to the sound of a baby's rattle.

As shown in FIGS. 7 and 8, a divisor plate (500) with outer diameter equal to the inner diameter of the edge of the lower hemispherical element (200) or the upper hemispherical element (300); and having an inner diameter equal to the outer diameter of the first valve coupling plunger (202) of the lower hemispherical element (200), engages the interior of the edge of the lower hemispherical element (200) wherein its outer edge rests on the flat surfaces (206) of the plurality of projections that make up the columns (205) and its inner edge rests on the surfaces of the four brackets (204a), (204b), (204c and 204d "not shown") of the outer wall of the first valve coupling plunger (202). During the coupling of the lower hemispherical element (200) with the upper hemispherical element (300), the flat surfaces (306) corresponding to the retaining columns (305) additionally retain the outer edge of the divisor plate (500), firmly holding the plate (500) inside the dosing cap of the present invention, so that it ensures that the acoustic elements (600) remain solely within the lower hemispherical element (200).

The divisor plate (500) further comprises on the outer and inner edges of both faces, a plurality of triangular projections (but not limited in said shape) arranged equidistantly between each other. The triangular projections are inserted between the retaining columns (205) of the lower hemispherical element (200) and the retaining columns (305) of the upper hemispherical element (300), for retaining the dividing disk (500) inside of the lower hemispherical element (200).

During the assembly of the lower hemispherical element (200) with the upper hemispherical element (300), the diffuser section (403) of the flow valve (400) inserts into the second valve coupling plunger (302) which is located inside the upper hemispherical element (300) centered in the dome, wherein said second valve coupling plunger (302) surrounds the opening/closing orifice (301).

The assembly of the flow (400) is carried out by the snap-in insertion of the annular sealing flange (408) of the diffuser section (403) with the annular sealing flange (307) of the upper hemispherical element (300); wherein the annular sealing flange (408) of the diffuser section (403) fits within the second valve coupling plunger (302) of the upper hemispherical member (300).

As shown in FIG. 7, the length of the second valve coupling plunger (302) is equal to the length of the diffuser section (403) of the flow valve (400) (not considering the plug (411)). In a "closed" state of the dosing cap of the present invention, the coupling section (401) of the flow valve (400) slides upwardly inside the first coupling plunger (202) of the lower hemispherical element (200), together the diffuser section (403) of the flow valve (400) slides upwardly within the second valve coupling plunger (302) until the insertion of the plug (411) of the valve (400) within the valve opening/closing orifice (301) of the upper hemispherical element (300) wherein the annular surface (303) which forms part of the inner wall of the upper hemispherical element (300) covers the diffuser openings (410) of the flow valve (400). Additionally, the plug (411) engages the annular sealing edge (304) of the upper hemispherical member (300) and the annular sealing flange (408) together with the coupling and sealing section (412) of the diffuser section (403) of the flow valve (400) couples to the interior of the second valve coupling plunger (302), whereby a seal is obtained which prevents the product flowing inside the flow valve (400) from the diffuser openings (410).

In a "open" state of the dosing cap of the present invention, the coupling section (401) of the flow valve (400) slides down into the interior of the first coupling plunger (202) of the lower hemispherical element (200) having as a lower limit the annular retaining ring (203) which prevents the flow valve (400) from moving out of the coupling orifice (201, not shown), the diffuser section (403) of the flow valve (400) slides downwardly within the second valve coupling plunger (302), together with the plug (411) of the valve (400) being released from the valve opening/closing orifice (301) and the annular seal rim (304) of the upper hemispherical element (300). As a result, the diffuser openings (410) of the flow valve (400) within the second coupling plunger (302) are uncovered, which allows the product to be dosed from the flow valve (400) through the opening/closing orifice (301) of the upper hemispherical element (300); wherein the annular sealing flange (408) of the diffuser section (403) of the flow valve (400) and the annular sealing flange (408) of the second valve coupling plunger (302) of the upper hemispherical element (300) seal the second valve coupling plunger (301), preventing the product flowing out of the flow valve (400) from flowing into the spherical dosing cap (100) of the present invention.

The upper hemispherical element (300) is coupled to the lower hemispherical element (200) by inserting the outer stepped perimetric slot (207) which is arranged on the outer wall of the edge of the lower hemispherical element (200) with the inner stepped perimetric slot (308) which is arranged on the inner wall on the periphery of the hemispherical upper element (300), forming the body of the spherical dosing cap of the present invention.

Accordingly, many modifications and other embodiments set forth herein will become apparent to one skilled in the art, having the benefit of the teachings presented in the foregoing descriptions and associated drawings. Therefore, the modifications and other embodiments are intended to be included within the scope of this application. Although specific terms are used in this document, they are used in a generic and descriptive sense only, and not for limiting purposes.

The invention claimed is:

1. A spheroidal dosing cap which comprises: a spheroidal body consisting of a lower hemispherical element and a upper hemispherical element, wherein the upper hemispherical element comprises a valve opening/closing orifice in its dome; and wherein the lower hemispherical element comprises a coupling orifice in its dome; a flow valve coupled inside a spheroidal body, which defines a cylindrical non-uniform hollow one-piece body and comprises a conduit flow in its interior and on its surface a plug supported by at least two supporting elements, arranged in the center of the hollow surface and surrounded by at least two diffuser openings.

2. The spheroidal dosing cap of claim 1, wherein further comprising: a dividing plate with an outer diameter equal to the inner diameter of the edge of the lower hemispherical element or the upper hemispherical element.

3. The spheroidal dosing cap of claim 2, wherein the divisor plate is disposed into the interior of the edge of the lower hemispherical element.

4. The spheroidal dosing cap of claim 2, wherein the divisor plate further comprises on the outer and inner edges a plurality of triangular projections.

5. The spheroidal dosing cap of claim 3, wherein further comprises: acoustic elements arranged inside the lower hemispherical element and retained by the divisor plate.

6. The spheroidal dosing cap of claim 1, wherein the coupling orifice projects to the interior of the lower hemispherical element through a cylindrical wall forming a first valve coupling plunger having at its lower end an annular valve retaining ring which forms part of the inner wall of the lower hemispherical element.

7. The spheroidal dosing cap of claim 2, wherein the inner wall of the first valve coupling plunger comprises at least one retaining protrusion arranged longitudinally on the inner wall of the first valve coupling plunger, from the annular retaining ring to the upper end of the first valve coupling plunger.

8. The spheroidal dosing cap of claim 2, wherein the first valve coupling plunger comprises on its outer wall at least four retaining brackets with a flat surface, arranged longitudinally on the inner outer wall of the first valve coupling plunger and equidistantly on its outer circumference, projecting from the lower end towards the upper end of the first valve coupling plunger.

9. The spheroidal dosing cap of claim 1, wherein the inner wall of the lower hemispherical element comprises on its periphery a plurality of projections that form retaining columns with a flat surface, which project on the curvature and equidistantly on the inner circumference near the edge of the lower hemispherical element.

10. The spheroidal dosing cap of claim 1, wherein the coupling means of the lower hemispherical element consists of an outer stepped perimetric slot arranged on the outer wall on the periphery of the edge of the lower hemispherical element.

11. The spheroidal dosing cap of claim 1, wherein the upper hemispherical element comprises a second valve coupling plunger arranged inside the upper hemispherical element surrounding the valve opening/closing orifice and an annular surface forming part of the inner wall of the upper hemispherical element.

12. The spheroidal dosing cap of claim 11, wherein the annular surface comprises an annular sealing edge around the periphery of the valve opening/closing orifice, wherein the annular sealing edge projects into the interior of the upper hemispherical element.

13. The spheroidal dosing cap of claim 1, wherein the inner wall of the upper hemispherical element comprises, a plurality of projections forming retaining columns with a flat surface which are located equidistantly from each other on the circumference of the upper hemispherical element.

14. The spheroidal dosing cap of claim 1, wherein the inner wall of the second valve coupling plunger includes, near its upper end, an annular sealing flange.

15. The spheroidal dosing cap of claim 1, wherein the coupling means of the upper hemispherical element consists of an inner stepped perimetric slot arranged on the inner wall on the periphery of the edge of the upper hemispherical element.

16. The spheroidal dosing cap of claim 1, wherein the flow valve is one-piece hollow body of non-uniform cylindrical shape which comprises a conduit flow therein.

17. The spheroidal dosing cap of claim 16, wherein the lower end of the flow valve comprises a coupling section formed by a lower cylindrical body having a plurality of longitudinal projections on its outer wall and a helical flange on its inner wall that allows the threaded coupling between the helical flange of the flow valve and the threaded lip of the container in which the spheroidal dosing cap is mounted.

18. The spheroidal dosing cap of claim 17, wherein the inner diameter of the coupling section is proportional to the diameter of the lip or neck of the container where the spherical dosing valve is fitted, in such a way that allows the threaded connection between the helical flange of the coupling section of the flow valve and the threaded neck of the container.

19. The spheroidal dosing cap of claim 16, wherein the central part of the flow valve comprises a flow section composed of a cylindrical body smaller in diameter than the diameter of the coupling section and larger in diameter than the inner diameter of the second valve coupling plunger of the upper hemispherical element.

20. The spheroidal dosing cap of claim 19, wherein the flow section fits the coupling section through a diameter reducing ring arranged at the upper end of the coupling section and at the lower end of the flow section (402).

21. The spheroidal dosing cap of claim 19, wherein the lower end of the flow section projects into the coupling section forming a tapered edge which couples to the interior of the container lip when the coupling section of the flow valve.

22. The spheroidal dosing cap of claim 19, wherein a plurality of supporting elements reinforce the connection between the coupling section (401) and the flow section, wherein the plurality of supporting elements are arranged equidistantly over the entire circumference of the diameter reducing ring.

23. The spheroidal dosing cap of claim 16, wherein the upper end of the flow valve comprises a diffuser section which defines a cylindrical body smaller in diameter than the diameter of the body of the flow section; wherein the diffuser section is attached to the flow section by an angled reducing ring arranged at the upper end of the flow section and at the lower end of the diffuser section.

24. The spheroidal dosing cap of claim 23, wherein the diffuser section includes, near its upper end, an annular sealing flange which snaps into the interior of the second valve coupling plunger of the upper hemispherical element.

25. The spheroidal dosing cap of claim 1, wherein the plug has a cylindrical shape, wherein the fluid through the inner duct of the flow valve to the dosing openings.

26. The spheroidal dosing cap according to claim 1, wherein the diameter dimension of the plug is equal to the diameter of the valve opening/closing orifice of the upper hemispherical element, which allows the snap-in insertion of the plug in said valve opening/closing orifice.

27. The spheroidal dosing cap according to claim 23, wherein the lower part of the diffuser section has a coupling and sealing section having a diameter equal to the inner diameter of the second valve coupling plunger of the upper hemispherical element; and larger than the end upper part of the diffuser section.

\* \* \* \* \*